US010777858B2

(12) United States Patent
Spence

(10) Patent No.: US 10,777,858 B2
(45) Date of Patent: Sep. 15, 2020

(54) METHODS FOR PURIFYING AND RECYCLING LEAD FROM SPENT LEAD-ACID BATTERIES

(71) Applicant: CPS Technology Holdings LLC, New York, NY (US)

(72) Inventor: Matthew A. Spence, Lindenhurst, IL (US)

(73) Assignee: CPS Technology Holdings LLC, New York, NY (US)

( * ) Notice: Subject to any disclaimer, the term of this patent is extended or adjusted under 35 U.S.C. 154(b) by 289 days.

(21) Appl. No.: 15/671,857

(22) Filed: Aug. 8, 2017

(65) Prior Publication Data

US 2017/0338530 A1 Nov. 23, 2017

Related U.S. Application Data

(62) Division of application No. 14/498,748, filed on Sep. 26, 2014, now Pat. No. 9,751,067.

(Continued)

(51) Int. Cl.
*H01M 10/54* (2006.01)
*B01J 8/00* (2006.01)
(Continued)

(52) U.S. Cl.
CPC ............. *H01M 10/54* (2013.01); *B01J 6/001* (2013.01); *B01J 6/002* (2013.01); *B01J 8/008* (2013.01);
(Continued)

(58) Field of Classification Search
CPC .......... H01M 10/54; H01M 6/52; B01J 6/001; B01J 6/002; B01J 8/008; B01J 19/06;
(Continued)

(56) References Cited

U.S. PATENT DOCUMENTS 4,118,219 A 10/1978 Elmore et al.
4,220,628 A 9/1980 Kolakowski
(Continued)

FOREIGN PATENT DOCUMENTS

CA 2141906 A1 4/1996
CA 2319285 A1 3/2002
(Continued)

OTHER PUBLICATIONS

Zhu, Xinfeng; Leaching of Spent Lead Acid Battery Paste Components by Sodium Citrate and Acetic Acid; Journal of Hazardous Materials, Feb. 19, 2013; pp. 387-396.
(Continued)

*Primary Examiner* — Helen Oi K Conley
(74) *Attorney, Agent, or Firm* — Boardman & Clark LLP

(57) ABSTRACT

The present disclosure relates to methods by which lead from spent lead-acid batteries may be extracted, purified, and used in the construction of new lead-acid batteries. A method includes: (A) forming a mixture including a carboxylate source and a lead-bearing material; (B) generating a first lead salt precipitate in the mixture as the carboxylate source reacts with the lead-bearing material; (C) increasing the pH of the mixture to dissolve the first lead salt precipitate; (D) isolating a liquid component of the mixture from one or more insoluble components of the mixture; (E) decreasing the pH of the liquid component of the mixture to generate a second lead salt precipitate; and (F) isolating the second lead salt precipitate from the liquid component of the mixture. Thereafter, the isolated lead salt precipitate may be converted to leady oxide for use in the manufacture of new lead-acid batteries.

11 Claims, 6 Drawing Sheets

Related U.S. Application Data

(60) Provisional application No. 62/015,058, filed on Jun. 20, 2014, provisional application No. 62/015,042, filed on Jun. 20, 2014, provisional application No. 62/015,045, filed on Jun. 20, 2014, provisional application No. 62/015,070, filed on Jun. 20, 2014.

(51) Int. Cl.

| *B01J 6/00*  | (2006.01) |
|---|---|
| *C22B 3/00*  | (2006.01) |
| *C22B 7/00*  | (2006.01) |
| *H01M 6/52*  | (2006.01) |
| *C22B 3/02*  | (2006.01) |
| *C22B 3/04*  | (2006.01) |
| *B01J 19/06* | (2006.01) |
| *B01J 19/24* | (2006.01) |

(52) U.S. Cl.
CPC ........... *B01J 19/06* (2013.01); *B01J 19/2465* (2013.01); *C22B 3/02* (2013.01); *C22B 3/04* (2013.01); *C22B 7/006* (2013.01); *C22B 7/007* (2013.01); *C22B 7/009* (2013.01); *C22B 13/04* (2013.01); *C22B 13/045* (2013.01); *H01M 6/52* (2013.01); *B01J 2208/00805* (2013.01); *Y02P 10/234* (2015.11); *Y02W 30/84* (2015.05)

(58) Field of Classification Search
CPC .......... B01J 19/2465; C22B 3/02; C22B 3/04; C22B 7/006; C22B 7/007; C22B 7/009; C22B 13/04; C22B 13/045
See application file for complete search history.

(56) References Cited

U.S. PATENT DOCUMENTS

| 4,269,811 | A  | 5/1981  | Striffler, Jr.    |
|---|---|---|---|
| 4,336,236 | A  | 6/1982  | Kolakowski et al. |
| 5,292,456 | A  | 3/1994  | Francis et al.    |
| 5,342,499 | A  | 8/1994  | Holbein et al.    |
| 5,429,661 | A  | 7/1995  | Khodov et al.     |
| 5,460,730 | A  | 10/1995 | Czerny et al.     |
| 5,514,263 | A  | 5/1996  | Spijkerman et al. |
| 5,630,931 | A  | 5/1997  | Manequini         |
| 5,690,718 | A  | 11/1997 | Sabin             |
| 5,827,347 | A  | 10/1998 | Margulis          |
| 5,840,262 | A  | 11/1998 | Margulis          |
| 5,879,830 | A  | 3/1999  | Olper et al.      |
| 5,944,869 | A  | 8/1999  | Modica et al.     |
| 6,110,433 | A  | 8/2000  | Kleinsorgen et al.|
| 6,150,050 | A  | 11/2000 | Mathew et al.     |
| 6,471,743 | B1 | 10/2002 | Young et al.      |
| 7,090,760 | B2 | 8/2006  | Seo et al.        |
| 7,498,012 | B2 | 3/2009  | Olper et al.      |
| 7,507,496 | B1 | 3/2009  | Kinsbursky et al. |
| 7,608,178 | B2 | 10/2009 | De Jonghe et al.  |
| 7,713,502 | B2 | 5/2010  | Koehler et al.    |
| 7,772,452 | B2 | 8/2010  | Modica            |
| 7,799,294 | B2 | 9/2010  | Kordosky et al.   |
| 7,833,646 | B2 | 11/2010 | Zenger et al.     |
| 8,147,780 | B2 | 4/2012  | Martini           |
| 8,323,376 | B2 | 12/2012 | Kumar et al.      |
| 8,323,595 | B1 | 12/2012 | Smith et al.      |
| 8,562,923 | B1 | 10/2013 | Smith et al.      |
| 2006/0239903 | A1 | 10/2006 | Guerriero et al. |
| 2007/0028720 | A1 | 2/2007  | Sommariva et al. |
| 2010/0040938 | A1 | 2/2010  | Kumar            |
| 2010/0043600 | A1 | 2/2010  | Martini          |
| 2010/0143219 | A1 | 6/2010  | Chow             |
| 2011/0129410 | A1 | 6/2011  | Trindade         |
| 2012/0186397 | A1 | 7/2012  | Martini          |
| 2013/0064743 | A1 | 3/2013  | Laurin et al.    |

FOREIGN PATENT DOCUMENTS

| CN | 1357938        |    | 7/2002  |
|---|---|---|---|
| CN | 1451771        |    | 10/2003 |
| CN | 1470675        |    | 1/2004  |
| CN | 1601805        |    | 3/2005  |
| CN | 1812183        |    | 8/2006  |
| CN | 101104887      |    | 1/2008  |
| CN | 101104890      |    | 1/2008  |
| CN | 101205080      |    | 6/2008  |
| CN | 201071389      |    | 6/2008  |
| CN | 101250720      |    | 8/2008  |
| CN | 101291008      |    | 10/2008 |
| CN | 101318692      |    | 12/2008 |
| CN | 101345328      |    | 1/2009  |
| CN | 101414698      |    | 4/2009  |
| CN | 101488597      |    | 7/2009  |
| CN | 101514395      |    | 8/2009  |
| CN | 101540395      |    | 9/2009  |
| CN | 101608264      |    | 12/2009 |
| CN | 101613803      |    | 12/2009 |
| CN | 101615707      |    | 12/2009 |
| CN | 101748277      |    | 6/2010  |
| CN | 101759158      |    | 6/2010  |
| CN | 101771181      |    | 7/2010  |
| CN | 101792176      |    | 8/2010  |
| CN | 101831668      |    | 9/2010  |
| CN | 101899576      |    | 12/2010 |
| CN | 101994007      |    | 3/2011  |
| CN | 102020374      |    | 4/2011  |
| CN | 102020375      |    | 4/2011  |
| CN | 102031380      |    | 4/2011  |
| CN | 102162034      |    | 8/2011  |
| CN | 102306855      |    | 1/2012  |
| CN | 102306856      |    | 1/2012  |
| CN | 102351217      |    | 2/2012  |
| CN | 102396099      |    | 3/2012  |
| CN | 102427149      |    | 4/2012  |
| CN | 202285265      |    | 6/2012  |
| CN | 102560122      |    | 7/2012  |
| CN | 102560535      |    | 7/2012  |
| CN | 103050745      |    | 4/2013  |
| DE | 69905134       | T2 | 10/2003 |
| EP | 0905810        | A2 | 3/1999  |
| EP | 1656463        | A1 | 5/2006  |
| EP | 1684369        | A1 | 7/2006  |
| EP | 1728764        | A1 | 12/2006 |
| EP | 2182569        | A1 | 5/2010  |
| EP | 2312686        | A1 | 4/2011  |
| EP | 2333895        | A1 | 6/2011  |
| EP | 2450991        | A1 | 5/2012  |
| EP | 2604711        | A1 | 6/2013  |
| JP | H10162868      |    | 6/1998  |
| RU | 2298044        | C2 | 4/2007  |
| RU | 2302059        | C1 | 6/2007  |
| TW | 391986         |    | 6/2000  |
| TW | 200937702      |    | 9/2009  |
| WO | WO0121846      | A1 | 3/2001  |
| WO | WO03025235     | A1 | 3/2003  |
| WO | WO2005007904   | A1 | 1/2005  |
| WO | WO2008047956   | A1 | 4/2008  |
| WO | WO2008056125   | A1 | 5/2008  |
| WO | WO2008087684   | A1 | 7/2008  |
| WO | WO2011138996   | A1 | 11/2011 |

OTHER PUBLICATIONS

PCT International Search Report and Written Opinion for PCT Application No. PCT/US2015/035257 dated Sep. 2, 2015.
PCT International Search Report and Written Opinion for PCT Application No. PCT/US2015/034758 dated Dec. 23, 2015.
PCT International Search Report and Written Opinion for PCT Application No. PCT/US2015/034694 dated Dec. 23, 2015.
PCT International Search Report and Written Opinion for PCT Application No. PCT/US2015/034761 dated Dec. 23, 2015.
PCT International Search Report and Written Opinion for PCT Application No. PCT/US2015/034717 dated Dec. 23, 2015.

METHODS FOR PURIFYING AND RECYCLING LEAD FROM SPENT LEAD-ACID BATTERIES

CROSS-REFERENCE

This application claims is a divisional of U.S. patent application Ser. No. 14/498,748, entitled, "METHODS FOR PURIFYING AND RECYCLING LEAD FROM SPENT LEAD-ACID BATTERIES," filed Sep. 26, 2014, now U.S. Pat. No. 9,751,067, which claims priority from and the benefit of U.S. Provisional Application Ser. No. 62/015,045, entitled "METHODS FOR PURIFYING AND RECYCLING LEAD FROM SPENT LEAD-ACID BATTERIES", filed Jun. 20, 2014, U.S. Provisional Application Ser. No. 62/015,042, entitled "SYSTEMS AND METHODS FOR PURIFYING AND RECYCLING LEAD FROM SPENT LEAD-ACID BATTERIES", filed Jun. 20, 2014, U.S. Provisional Application Ser. No. 62/015,058, entitled "SYSTEMS AND METHODS FOR CLOSED-LOOP RECYCLING OF A LIQUID COMPONENT OF A LEACHING MIXTURE WHEN RECYCLING LEAD FROM SPENT LEAD-ACID BATTERIES", filed Jun. 20, 2014, U.S. Provisional Application Ser. No. 62/015,070, entitled "SYSTEMS AND METHODS FOR SEPARATING A PARTICULATE PRODUCT FROM PARTICULATE WASTE WHEN RECYCLING LEAD FROM SPENT LEAD-ACID BATTERIES", filed Jun. 20, 2014, which are hereby incorporated by reference for all purposes.

BACKGROUND

The present disclosure relates generally to systems and methods for recycling spent lead-acid batteries, and more specifically, relates to purifying and recycling the lead content of lead-acid batteries.

The lead used in the manufacture of the active material of new lead-acid batteries is typically in the form of lead oxide (PbO) that is typically produced by oxidizing a lead source having a high purity (e.g., 99.95% Pb). Lead oxide of high-purity is generally desirable when manufacturing lead-acid batteries since certain impurities (e.g., antimony, barium sulfate, tin) may enable side-reactions that can significantly affect battery cell performance. While it may be desirable to attempt to recover lead from the waste of spent or retired lead-acid batteries, this material may include a variety of lead compounds (lead alloys, oxides, sulfates and carbonates) and an array of physical and/or chemical impurities. Existing methods for purifying lead typically rely almost entirely on multi-stage pyrometallurgical smelting in which some of these compounds are combusted to produce volatile gases, some of which must be scrubbed (e.g., captured and removed from the exhaust stream) to prevent release, in accordance with environmental regulations, and subsequently the remaining impurities are removed from the metallic lead in various refining operations. Since these operations often require specialized equipment and certain consumables (e.g., solutions or other refining agents), this refinement process generally adds cost and complexity to the lead recovery process.

SUMMARY

The present disclosure relates to methods by which lead from spent lead-acid batteries may be extracted, purified, and used in the construction of new lead-acid batteries. In an embodiment, a method includes: (A) forming a mixture including a carboxylate source and a lead-bearing material; (B) generating a first lead salt precipitate in the mixture as the carboxylate source reacts with the lead-bearing material; (C) increasing the pH of the mixture to dissolve the first lead salt precipitate; (D) isolating a liquid component of the mixture from one or more insoluble components of the mixture; (E) decreasing the pH of the liquid component of the mixture to generate a second lead salt precipitate; and (F) isolating the second lead salt precipitate from the liquid component of the mixture.

In another embodiment, a method includes, (A) forming a mixture including a hydroxide and a lead-bearing material, wherein the pH of the mixture is greater than 7 and a temperature of the mixture is between 30° C. and 100° C.; (B) isolating a liquid component of the mixture from one or more insoluble components of the mixture; (C) adding a carboxylate source to the liquid component to decrease the pH of the liquid component and generate a lead salt precipitate; and (D) isolating the lead salt precipitate from the liquid component.

In another embodiment, a method includes reacting one or more impurities of a lead salt solution with at least one compound to evolve one or more impurity gases that are released from the lead salt solution. Further, the one or more impurities comprise an element or compound of Group 14, an element or compound of Group 15, an element or compound of Group 16, an element or compound of Group 17, or a combination thereof.

In another embodiment, a method includes, (A) forming a mixture including a carboxylate source and a lead-bearing material; (B) generating a first lead salt precipitate in the mixture as the carboxylate source reacts with the lead-bearing material; (C) increasing the pH of the mixture to dissolve the first lead salt precipitate; (D) isolating a liquid component of the mixture from one or more insoluble components of the mixture; (E) adding an antisolvent to the liquid component to generate a second lead salt precipitate; and (F) isolating the second lead salt precipitate from the liquid component of the mixture.

DRAWINGS

DETAILED DESCRIPTION

Figure 1:
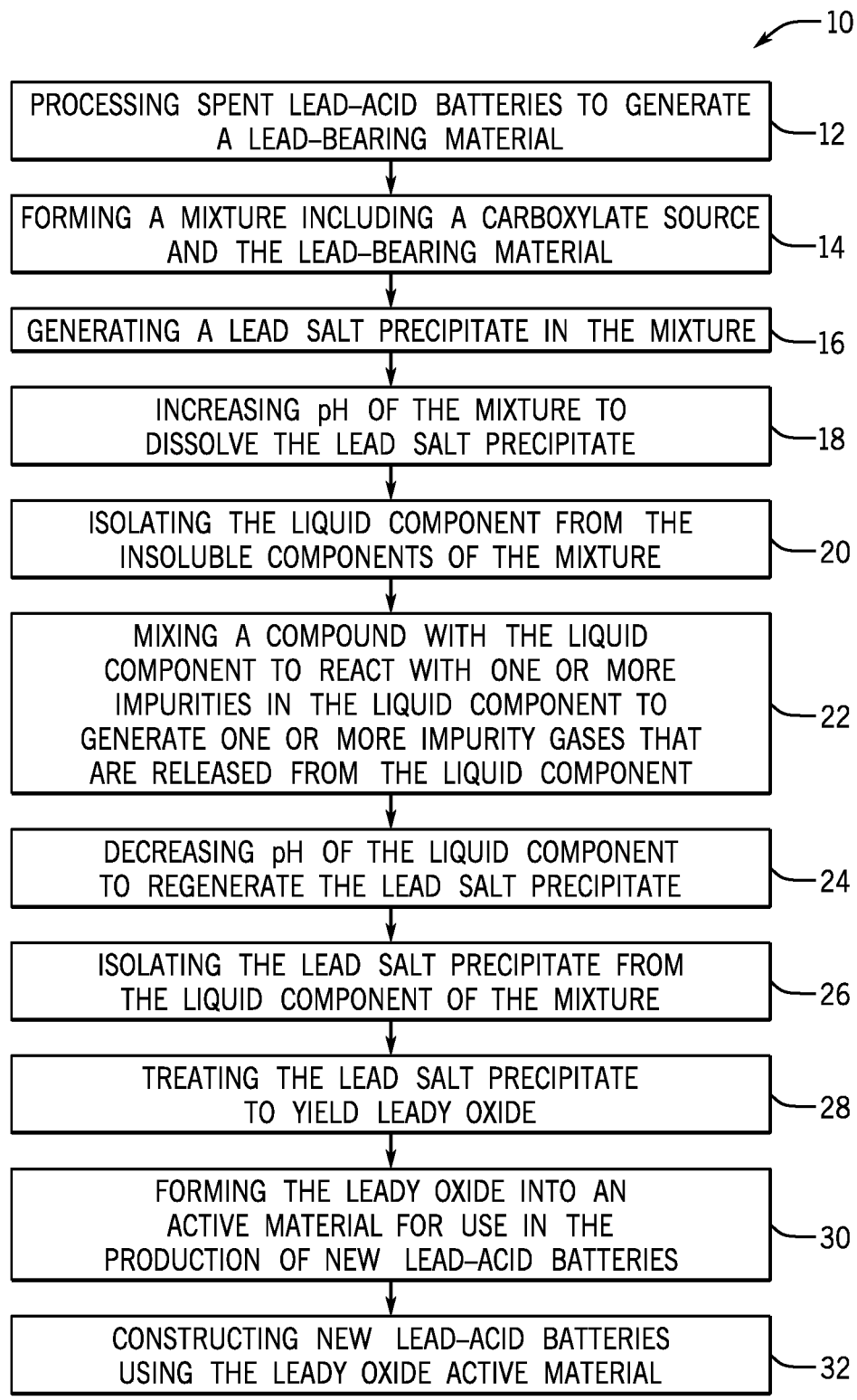
FIG. 1 is a flow diagram illustrating an embodiment of a process by which lead from spent lead-acid batteries may be extracted, purified, and used in the construction of new lead-acid batteries.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the disclosure of a particular component being made of or including a particular element called out by name (e.g., lead), should be interpreted to encompass all forms of lead (e.g., metallic lead, lead compounds, or mixtures thereof). For distinction, as used herein, the disclosure of a metallic form of an element may be indicated by the chemical formula (e.g., Pb(0)) or using the terms elemental, metallic, or free (e.g., elemental lead, metallic lead, or free lead). As used herein, "leady oxide" may be used to indicate a mixture of metallic lead (e.g., Pb(0)) and lead oxide (e.g., PbO) in various ratios as described. As used herein, the term "substantially free" may be used to indicate that the identified component is not present at all, or is only present in a trace amount (e.g., less than 0.1%, less than 0.01%, or less than 0.001%). As used herein, "an element or compound of Group X" may refer to any chemical substance (e.g., element or compound) that includes an element from the identified column of the periodic table. For example, "an element or compound of Group 14" may include any of the elements from Group 14 (e.g., carbon, silicon, tin, etc.) as well as any compounds that include Group 14 elements (e.g., carbonates, silicates, stannates, etc.). As used herein, a "carboxylate source" is any molecule or polymer that includes at least one carboxylate or carboxylic acid moiety or functionality. Accordingly, a non-limited list of example carboxylate sources include: citric acid, acetic acid, formic acid, citrate, acetate, formate, dilactate, oxalate, tartarate, or any combination thereof. The term "citrate" herein refers to citric acid, or a citrate salt of a Group 1 or Group 2 metal, or ammonium citrate. The term "acetate" herein refers to acetic acid, or acetate salts of a Group 1 or Group 2 metal, or ammonium acetate. "New lead-acid battery" herein refers to a newly produced lead acid battery, while the term "spent lead-acid battery," also referred to as a battery core, indicates a battery at the end of its useable service life. As used herein, an "antisolvent" is a solvent that may be added to a solution to facilitate the precipitation of a dissolved component (e.g., a lead salt). As used herein "peroxide" refers to hydrogen peroxide and/or any organic peroxide (e.g. peracetic acid). The term "hydroxide" herein indicates a Group 1 or Group 2 metal hydroxide, ammonium hydroxide, or ammonia gas introduced into the reaction mixture to form ammonium hydroxide in-situ, or combinations thereof.

As mentioned above, existing methods typically rely heavily on pyrometallurgical smelting or combustion to recover and purify lead from spent lead-acid batteries. For such methods, the lead-bearing material from spent lead-acid batteries, which may include a number of lead compounds and a number of impurities, may be heated such that at least a portion of the impurities may combust or volatilize and be released as byproducts. Additionally, after pyrometallurgical smelting or combustion of the lead-bearing material, such methods may involve subsequent refinement steps to remove byproducts or other impurities to yield purified lead. Since the atmospheric release of some of these combustion byproducts (e.g., $SO_2$, soot) may be restricted by local environmental regulations, present embodiments are directed toward enabling a solution-based removal of several impurities from the recovered lead, thereby avoiding or reducing the formation of such combustion byproducts and/or the cost associated with scrubbing them from the exhaust stream. Additionally, present embodiments address limitations of other waste lead purification techniques, enabling a robust technique for purifying and recycling of recovered lead on an industrial scale. That is, the presently disclosed technique is robust such that entire spent lead-acid batteries may be processed (e.g., broken apart, ground, or milled) and supplied as input, and, from this assorted mixture, the disclosed processes enable the formation of pure leady oxide for use in new lead-acid batteries. Accordingly, present embodiments enable a lead purification technique that is robust to the presence of a wide variety of impurities and provides enhanced control over the parameters of the purification process, while obviating or limiting reliance on conventional smelting and refining steps for purification and limiting the combustion of impurities.

FIG. 1 is a flow diagram illustrating an embodiment of a process 10 by which lead from spent lead-acid batteries may be extracted, purified, and used in the production of new lead-acid batteries. As illustrated in FIG. 1, the process 10 begins with processing (block 12) of spent lead-acid batteries (e.g., battery breaking) to generate a lead-bearing material. For example, in an embodiment, one or more lead-acid batteries may be fed through a hammer mill or another suitable device that is capable of crushing, pulverizing, grinding or otherwise physically breaking apart the entirety of the spent lead-acid battery. The components of the spent lead-acid battery may include, for example, metal posts, metal connectors, metal grids, carbon black, glass, a plastic or metal casing, plastic separators, plastic fibers, battery paste (e.g., including various lead oxides, lead sulfates and lead carbonates), and sulfuric acid, among other components. After being substantially pulverized, the resulting battery component mixture may, in certain embodiments, be passed through one or more preliminary purification steps in which certain components (e.g., the crushed plastic components) may be removed from the remainder of the lead-bearing material, for example, using a separation device that takes advantage of the lower density of these plastic components. Further, in certain embodiments, some, or all, of the residual sulfuric acid entrained in the lead-bearing material may be recycled for reuse, or neutralized and crystallized as a solid sulfate for disposal or resale. In certain embodiments, pre-treatment of the lead-bearing material may include a full or partial desulfurization stage in which the sulfate content of the lead-bearing material may be reduced by chemical means, for example, by treatment with a hydroxide (e.g., sodium hydroxide, NaOH) or carbonate (e.g., soda ash).

The illustrated method 10 continues with forming (block 14) a mixture that includes a carboxylate source and the lead-bearing material. For example, to the lead-bearing material from block 12, a sodium citrate solution may be added to form such a mixture. In certain embodiments, water, and/or a hydroxide, and/or a peroxide, and/or acetic acid may be added as well. In certain embodiments, the carboxylic source may be metal citrate (e.g., sodium citrate), ammonium citrate, citric acid, metal acetate (e.g., sodium acetate), ammonium acetate, acetic acid, a combination thereof, or any other suitable carboxylic source that may drive the formation of lead salts in the leaching mixture. In certain embodiments, this leaching step may be performed in a reactor, such as a continuously stirred leaching tank, and may be performed at low (acidic) pH (e.g., pH between 1 and 7) and at slightly elevated temperatures (e.g., approximately 30-100° C.). The resulting mixture includes both soluble and insoluble residuals from the spent and pulverized batteries. Additionally, the carboxylic source in the mixture reacts with one or more forms of lead in the mixture (e.g., metallic lead, lead sulfate, lead carbonate, and lead oxide), with or without the assistance of the peroxide and/or an acetate that may be present in the mixture, to yield a lead salt (e.g., lead citrate, lead acetate). Since the lead salt may have limited solubility in the mixture at these low pH levels, a lead salt precipitate (e.g., a lead citrate precipitate, a lead acetate precipitate) may be generated (block 16) in the mixture as a result.

However, as mentioned above, the lead salt precipitate present in the mixture is also interspersed with residual insoluble components from the crushed batteries. As such, continuing through the method 10, the pH of the mixture may be increased (block 18) to dissolve the lead salt precipitate into the liquid component of the mixture. For example, in certain embodiments, the pH of the mixture may be increased above approximately 7, above approximately 8, between approximately 8 and approximately 14, or between approximately 8 and 12. In certain embodiments, this pH increase may be affected through the addition of a hydroxide. In certain embodiments, the hydroxide may be added slowly or all at once. Further, in certain embodiments, the pH increase of block 18 may occur in a separate reaction vessel or reaction stage from the steps of the preceding blocks.

Accordingly, once the lead salt precipitate has been dissolved in the mixture, the liquid component of the mixture may be isolated (block 20) from the insoluble components of the mixture. For example, these insoluble components may include: barium sulfate, carbon black, glass, polymer, or a combination thereof. Additionally, the insoluble components may include residual metallic lead pieces from solid battery parts (terminals, connectors, grids), composed of a lead alloy that may include lead, antimony, arsenic, selenium, calcium, tin, silver, cadmium, or a combination thereof. In certain embodiments, these residual insoluble battery components may be filtered out or otherwise isolated from the liquid component of the mixture. Further, one or more of these insoluble components may be subsequently fed into other treatment or purification systems and/or techniques in accordance with embodiments of the present disclosure.

Subsequently, the liquid component isolated in block 20 may, in certain embodiments, undergo an additional purification step before the lead salt is precipitated and isolated. It should be noted that, for consistency, the term "liquid component" is used throughout subsequent steps to describe the liquid component initially isolated in block 20, even when this liquid is not part of a mixture (e.g., no solids present) and even as the liquid is modified throughout subsequent steps discussed below. With this in mind, the liquid component isolated in block 20 may be mixed (block 22) with a compound that reacts with one or more soluble impurities present in the liquid component to generate one or more impurity gases, which are then released from the liquid component. In general, the reactant is a reducing agent, such as a hydride source (e.g., sodium tetraborohydride, sodium hydride, hydrogen gas, or syngas), that is capable of reacting with one or more soluble impurities in the liquid component to generate relatively volatile impurity gases that are subsequently vented from the liquid component. In general, the impurities in the liquid component may include: elements and/or compounds of Group 14 (e.g., carbonates, silicates, germanium salts, and/or tin salts), elements and/or compounds of Group 15 (e.g., phosphates, arsenic salts, antimony salts, and/or bismuth salts), elements and/or compounds of Group 16 (e.g., sulfates, selenium salts, and/or tellurium salts), elements and/or compounds of Group 17 (e.g., fluoride salts, chloride salts, bromide salts, and/or iodide salts), or a combination thereof. For example, the liquid component may include dissolved impurities that are chemical compounds (e.g., ionic salts and/or covalent molecules) of tellurium, antimony, tin, selenium, arsenic, germanium, silicon, phosphorus, sulfur, or any combination thereof. Accordingly, the reaction between these soluble impurities and the aforementioned reactant may yield: hydrogen telluride, antimony trihydride (stibine), tin tetrahydride (stannane), hydrogen selenide, arsenic trihydride (arsine), germanium tetrahydride (germane), silicon hydrides (silane), phosphine, hydrogen disulfide, or a combination thereof. These and possibly other impurity gases released from the liquid component may be subsequently passed to other purification techniques or systems in accordance with the present disclosure. As a result of the purification described in block 22, the liquid component is purified from some or all of the aforementioned soluble impurities, resulting in a liquid component that is substantially a lead salt solution (e.g., a lead citrate solution); however, some impurities (e.g., sodium sulfate) may still be present. In certain embodiments, the purification described in block 22 may be skipped and the isolated liquid component described in block 20 may directly advance to the next step (e.g., block 24) in the illustrated process 10. In certain embodiments, an alternative or additional step in the purification of the liquid component of block 20 may include the use of fine pure lead powder for cementation of impurities on the surface of the lead particles, and then this solid lead may be removed by a second solid/liquid separation stage.

Figure 2:
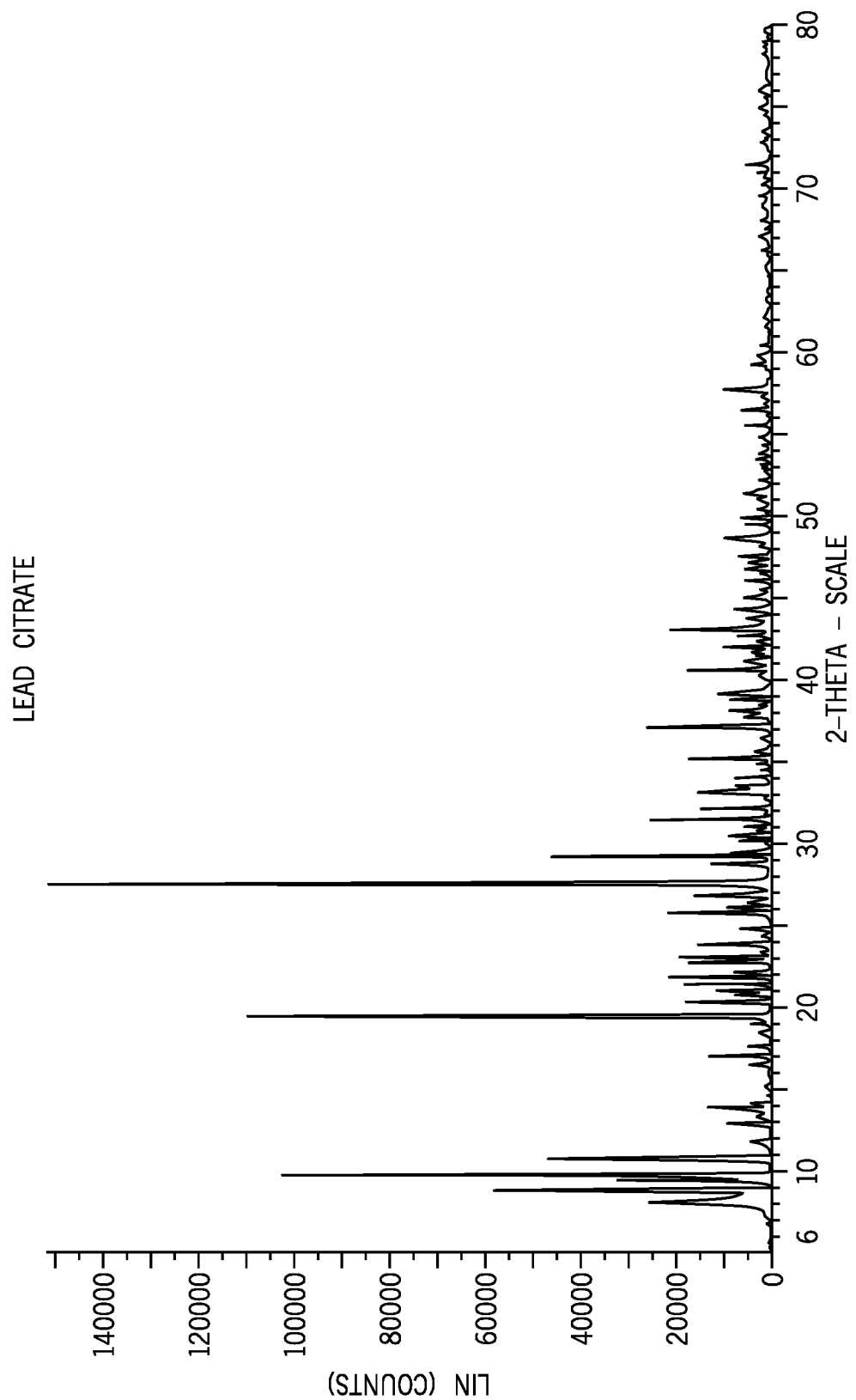
FIG. 2 is an X-ray diffraction (XRD) pattern of a lead citrate precipitate for an embodiment of the present approach.

Continuing through the process 10 illustrated in FIG. 1, the pH of the liquid component is decreased (block 24) in order to regenerate the lead salt precipitate. For example, an acid or buffer salt (e.g., citric acid, acetic acid, sodium citrate, sodium acetate, etc.) may be added to the liquid component to lower the pH to a value below 7 (e.g., between approximately 1 and approximately 6.5, or between approximately 3 and approximately 6) such that the solubility of the lead salt (e.g., lead citrate, lead acetate) in the liquid component is decreased, causing the lead salt to once again precipitate from the solution. Subsequently, this lead salt precipitate may be isolated (block 26) from the liquid component, for example, by filtration. After such a filtration, the lead salt precipitate may be washed with water, and the filtrate and wash water may retain all or most of the remaining impurities separated from the lead salt precipitate. For example, in certain embodiments, the isolated lead salt precipitate may include little or no residual sulfates (e.g., sodium sulfate and/or lead sulfate), such as less than 5% sulfates, less than 4% sulfates, less than 3% sulfates, less than 2% sulfates, less than 1% sulfates, less than 0.5% sulfates, less than 0.3% sulfates, or less than 0.1% sulfates. By specific example, FIG. 2 presents an X-ray diffraction pattern representative of a lead salt precipitate of the present approach in the form of a high purity lead citrate product. Further, it may be appreciated that the filtrate liquids (e.g., the liquid component and water washes) may be subsequently passed to other purification techniques in accordance with the present disclosure. Table 1, included below, provides chemical analysis data for an example input material (i.e., scrap battery paste, the lead-bearing material) and an example output material (i.e., a recovered lead citrate precipitate) as measured by ICP (inductively coupled plasma) spectrometry for an embodiment of the presently disclosed lead recovery method. Accordingly, Table 1 provides analytical data indicative of impurity levels in the lead bearing material and the recovered lead citrate salt for an embodiment of the present approach. From the values indicated in Table 1 it may be appreciated that, in certain embodiments, the recovered lead salt product (e.g., lead citrate) may be substantially free of impurities.

TABLE 1

Chemical analysis of scrap battery paste (i.e., the lead-bearing material) and an embodiment of the lead salt precipitate (i.e., lead citrate) using inductively coupled plasma (ICP) spectroscopy. Indicated values are listed in parts per million (ppm).

| Element | Scrap Battery Paste | Lead Citrate |
| --- | --- | --- |
| Silver (Ag) | 32 | 7 |
| Arsenic (As) | <1 | <1 |
| Barium (Ba) | 348 | 8 |
| Bismuth (Bi) | 90 | 7 |
| Calcium (Ca) | 189 | 11 |
| Cobalt (Co) | <1 | <1 |
| Chromium (Cr) | <1 | <1 |
| Copper (Cu) | 9 | 1 |
| Iron (Fe) | 20 | 3 |
| Manganese (Mn) | <1 | <1 |
| Nickel (Ni) | 2 | <1 |
| Platinum (Pt) | <1 | <1 |
| Sulfur (S) | 35734 | 229 |
| Antimony (Sb) | 285 | <1 |
| Selenium (Se) | <1 | <1 |
| Tin (Sn) | 626 | <1 |
| Strontium (Sr) | 4.9 | 0.5 |
| Tellurium (Te) | 1.7 | <0.3 |

Next in the process 10 illustrated in FIG. 1, the lead salt precipitate may be treated (block 28) to yield leady oxide. In certain embodiments, the lead salt precipitate may be treated using calcination. For example, during a calcination-based treatment, the lead salt precipitate may be heated to a temperature less than 450° C. (e.g., between approximately 275° C. and approximately 400° C., at approximately 330° C.), with or without presence of an additional oxidant (e.g., air, oxygen-enriched air, gas stream containing oxygen bearing compounds or an oxygen reducer (e.g. methane, coke, propane, natural gas, etc.), with or without addition of dopants to promote the formation of a preferred lead oxide crystal structure or particle morphology, such that the organic portion (e.g., citrate, acetate) combusts, resulting in a mixture of free lead (i.e., Pb(0)) and lead oxide (i.e., PbO), generally referred to as leady oxide. Examples of process controls for such calcination treatments that may affect the resulting leady oxide include: the temperature of the calcination, time, droplet size, agglomerate size, residual moisture in the lead salt, the rate at which the lead salt is heated to the calcination temperature, introduction of a reducing substance, premixing with a second lead salt (lead formate, lead acetate) and/or introduction of additional inert gas (e.g., nitrogen). In other embodiments, the lead salt precipitate may instead be treated with base (e.g., a 25-50 wt % sodium hydroxide solution) and a hydroxylation/dehydration reaction between the base and the lead salt precipitate may yield the desired leady oxide product. It may be appreciated that different methods of treating the lead salt precipitate may provide different leady oxides (e.g., different crystal structures, different amounts of free lead, etc.). For example, treating the lead salt precipitate with base may result in a leady oxide product having little or no (e.g., approximately 0%) free lead. In certain embodiments, after removal of the solid leady oxide product from the basic solution, the basic solution may be subsequently treated to regenerate a carboxylate salt to be reused (e.g., in block 14) in the process 10. Optionally, the leady oxide may be further processed by washing, milling or grinding to obtain physical characteristics suitable for the intended use.

Figure 5:
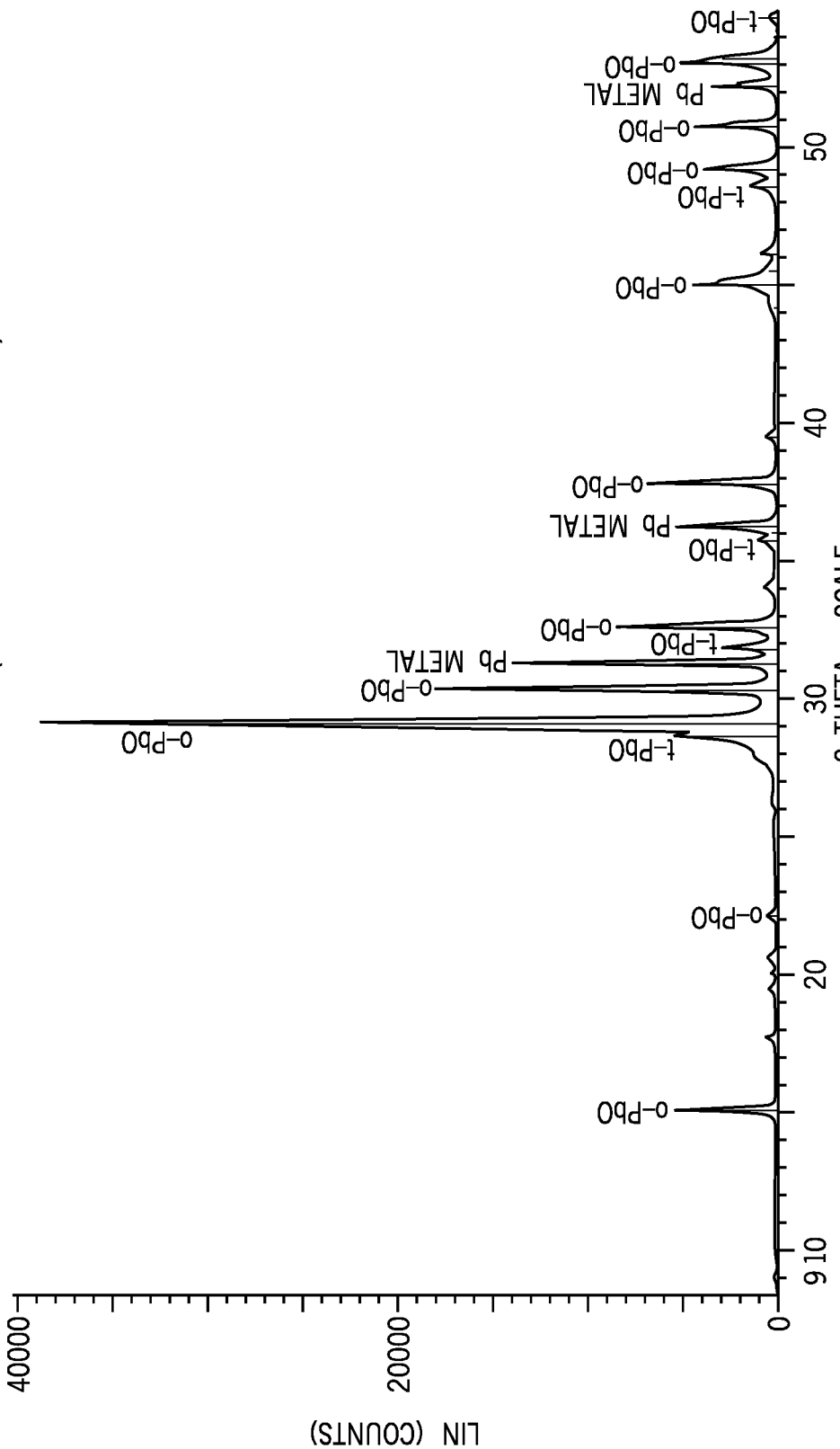
FIG. 5 is an X-ray diffraction (XRD) pattern of an embodiment of the leady oxide product formed via calcination of the recovered lead salt.
Figure 6:
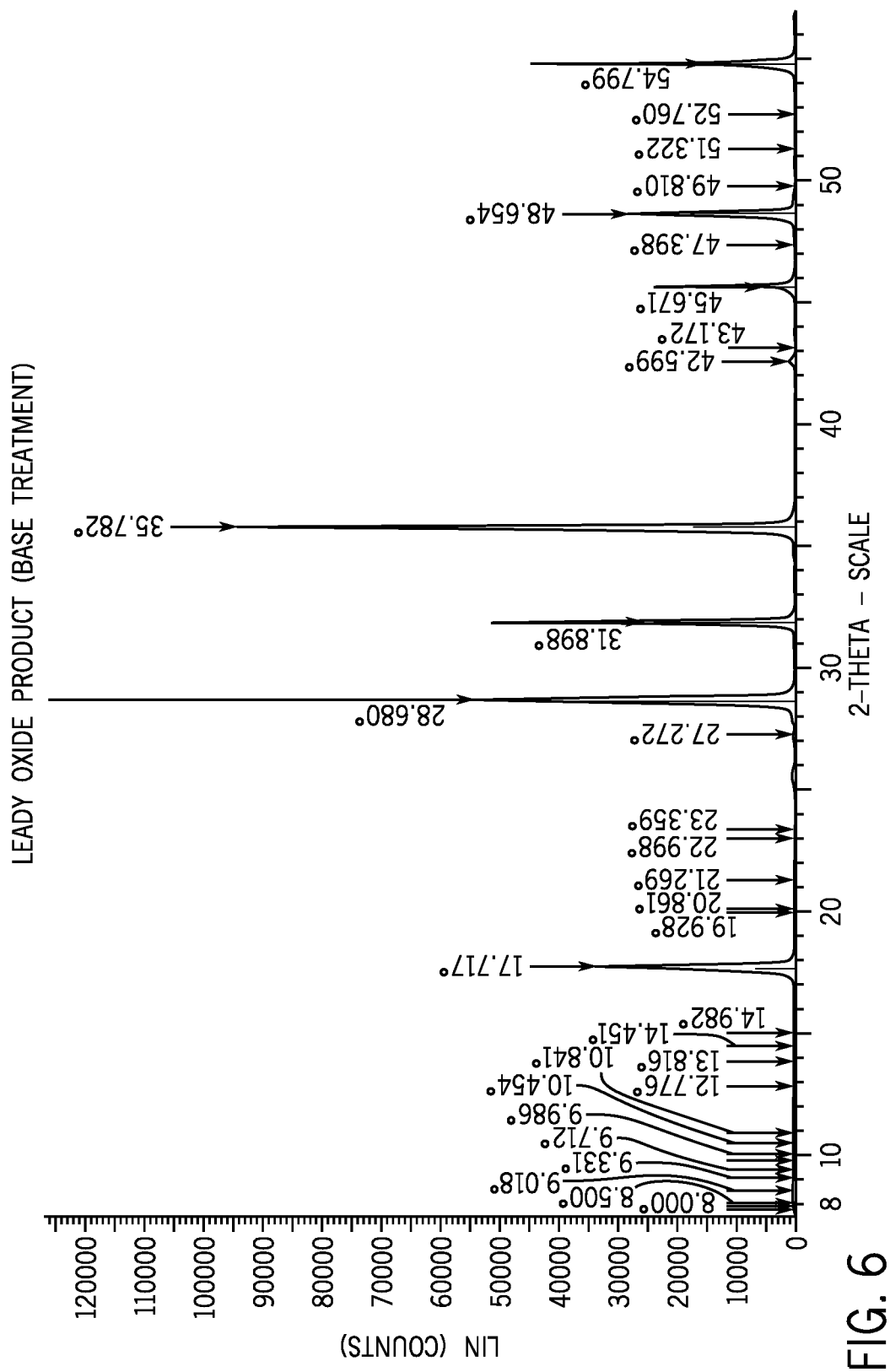
FIG. 6 is an X-ray diffraction (XRD) pattern of another embodiment of the lead oxide product formed via base treatment of the recovered lead salt.

Using the disclosed process 10, the generated leady oxide may include, for example, between approximately 0% and approximately 35%, between approximately 15% and approximately 30%, approximately 20%, or approximately 30% free lead. Additionally, in certain embodiments, the leady oxide particles may have a $D_{50}$ (i.e., an indication of average diameter, a diameter that is greater than the diameters of 50% of the synthesized leady oxide particles) between approximately 0.2 µm and approximately 4000 µm (e.g., between approximately 0.2 µm and approximately 1 µm, between approximately 0.2 µm and approximately 20 µm, between approximately 1 µm and 4000 µm). As such, it should be appreciated that the present approach may be useful for the synthesis of leady oxide nanoparticles that are 200 nm or more in diameter. Additionally, in certain embodiments, the leady oxide particles may have a Brunauer-Emmett-Teller (BET) surface area greater than approximately 1.0 square meters per gram ($m^2/g$) (e.g., greater than approximately 1.0 $m^2/g$, approximately 1.5 $m^2/g$, approximately 2.0 $m^2/g$, or approximately 2.5 $m^2/g$). Further, in certain embodiments, the leady oxide may have an acid absorption greater than approximately 100 milligrams (mg), 200 mg, or 300 mg $H_2SO_4$ per gram. In certain embodiments, the leady oxide may include less than approximately 20% beta phase lead oxide (β-PbO) (e.g., less than 1% β-PbO), while in other embodiments, the leady oxide may include greater than 80% β-PbO. FIG. 5 presents an X-ray diffraction pattern representative of a leady oxide product after a calcination treatment (in block 28), which demonstrates both PbO and Pb metal peaks. FIG. 6 presents an X-ray diffraction pattern representative of α-PbO lead oxide obtained by treatment of lead citrate with strong base. As such, it may be appreciated that the leady oxide particles formed by the present approach may enable the production of lead-acid batteries having good to excellent electrical performance.

The process 10 illustrated in FIG. 1 continues with the leady oxide produced from the treatment of block 28 being formed (block 30) into a leady oxide active material for use in new lead-acid battery production. For example, the leady oxide may be mixed with water and sulfuric acid to form a battery paste that may be applied to a plurality of lead grids to serve as the active material of a lead-acid battery. Accordingly, a lead-acid battery may be constructed (block 32) using the leady oxide battery paste formed in block 30. As mentioned above, the leady oxide active material formed by the present approach may enable the production of lead-acid batteries having good to excellent electrical performance.

The leady oxide formed in block 28 may also be used to manufacture tribasic lead sulfate (3BS), tetrabasic lead sulfate (4BS), and red lead (lead (II,IV) oxide, $Pb_3O_4$). In the case of 3BS and 4BS, the materials may be produced by mixing the leady oxide formed in block 28 with water and a sulfuric acid in a heated stirred tank reactor. In the case of red lead, in certain embodiments, the material may be formed directly from the lead salt (e.g., lead citrate), or from the intermediate leady oxide of block 28, by calcination and oxidation at temperatures between 450 and 500° C., for example.

Figure 3:
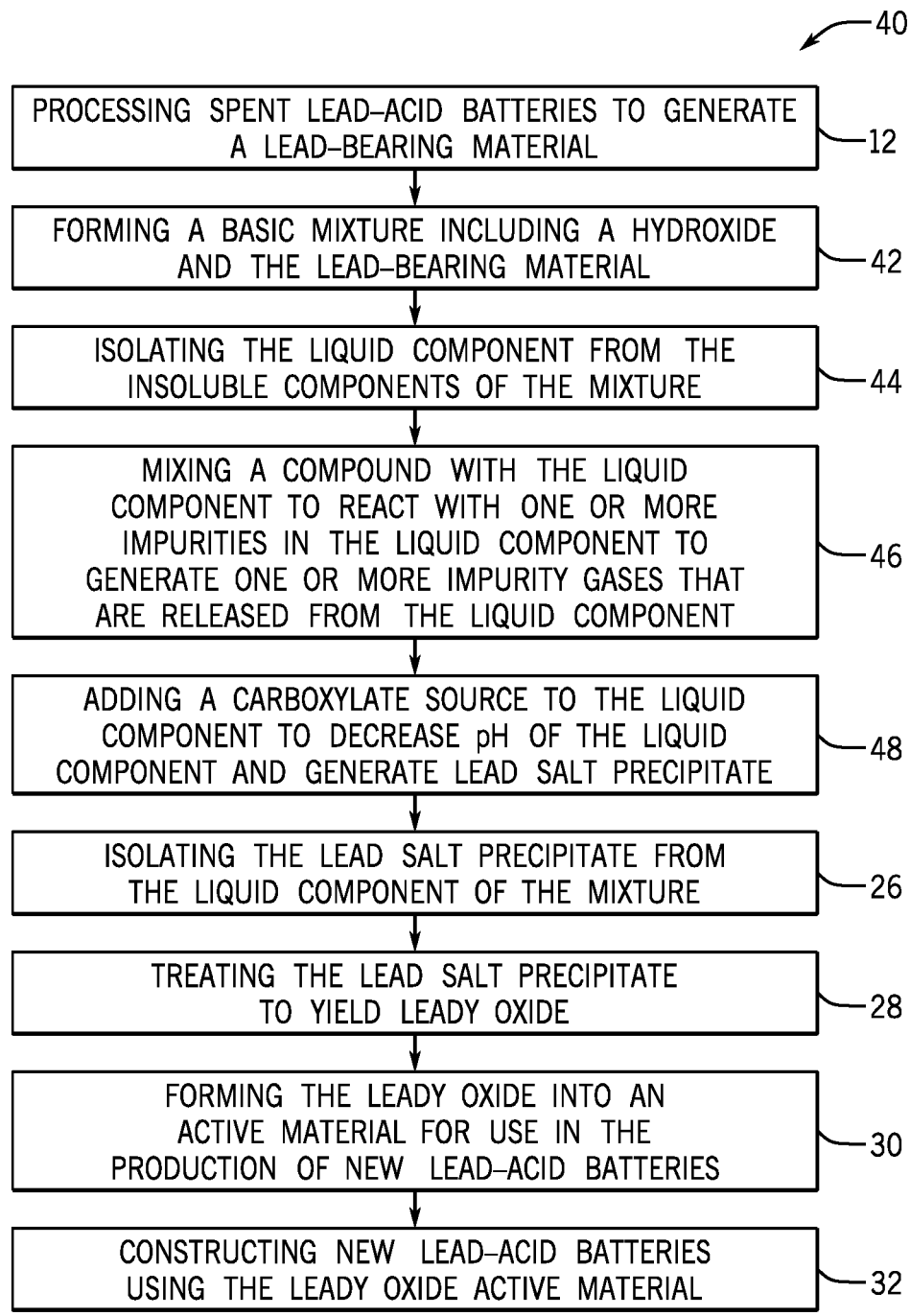
FIG. 3 is a flow diagram illustrating an embodiment of an alternative process by which lead from spent lead-acid batteries may be extracted, purified, and used in the construction of new lead-acid batteries.

FIG. 3 is a flow diagram illustrating an embodiment of a process 40 by which lead from spent lead-acid batteries may be extracted, purified, and used in the construction of a lead-acid battery. It may be appreciated that the process 40 illustrated in FIG. 3 is similar to the process 10 illustrated in FIG. 1; however, the process 40 illustrated in FIG. 3 includes fewer steps by delaying precipitation of the lead salt and, thereby, affording advantages in terms of efficiency. Like the process 10 illustrated in FIG. 1, the process 40 illustrated in FIG. 3 begins with processing (block 12) of spent lead-acid batteries to generate a lead-bearing material. As with block 12 of the process 10, this processing may include crushing and grinding the spent lead-acid batteries and one or more preliminary purification steps discussed in detail above. However, from there, the process 40 illustrated in FIG. 3 continues by forming (block 42) a basic mixture including a hydroxide and the lead-bearing material from block 12. For example, to the lead-bearing material from block 12, a hydroxide may be added to form a basic mixture. In certain embodiments, water, and/or a peroxide may be added prior to, the hydroxide component. In certain embodiments, this may be performed in a continuously stirred reactor, such as a leaching tank, at high pH (e.g., above 7, between 8 and 12) and slightly elevated temperatures (e.g., approximately 30 to 100° C.). The resulting mixture includes both soluble and insoluble residuals from the spent and pulverized lead-acid batteries. Additionally, the hydroxide in the mixture is capable of reacting with one or more forms of lead in the mixture (e.g., metallic lead, lead sulfate, lead carbonate, and lead oxide), with or without the assistance of peroxide that may be present, to yield a soluble lead salt.

Next, the liquid component of the mixture from block 42 may be isolated (block 44) from the insoluble components of the mixture. As discussed with respect to block 20 in FIG. 1, these insoluble components may include: barium sulfate, carbon black, glass, polymer, lead alloys, or a combination thereof. These insoluble components may be filtered or otherwise isolated from the liquid component of the mixture. As discussed above, these insoluble components may be subsequently fed into other lead purification systems and/or techniques.

Subsequently, the liquid component isolated in block 44 may optionally undergo an additional purification like that described in block 22 of FIG. 1. That is, continuing through the process 40 illustrated in FIG. 3, the liquid component isolated in block 44 may be mixed (block 46) with a compound (e.g., a reducing agent, a hydride source such as sodium tetraborohydride, sodium hydride, hydrogen gas, or syngas) capable of reacting the one or more soluble impurities present in the isolated liquid component to generate one or more impurity gases, which are released and/or separated from the liquid component. Consequentially, the liquid component is purified from some or all of these soluble impurities, resulting in a liquid component that is substantially a lead hydroxide solution; however, some impurities (e.g., sodium sulfate, other metal hydroxides) may still be present. In certain embodiments, block 46 may be skipped and the isolated liquid described in block 44 may directly advance to the next step (e.g., block 48) in the illustrated process 40.

Continuing through the process 40 illustrated in FIG. 3, a carboxylate source (e.g., citrate or acetate) may be added (block 48) to the liquid component to decrease the pH of the liquid and to generate a lead salt (e.g., lead citrate, lead acetate) precipitate. For example, a citrate (e.g., citric acid) may be added to the mixture to react with the lead compound in solution to form a lead citrate precipitate. Further, since the carboxylate source decreases the pH of the liquid below 8 (e.g., between approximately 2 and approximately 7), the solubility of the generated lead salt decreases, causing the lead salt to precipitate. As with the previously discussed method 10, the lead salt precipitate resulting from block 48 of the process 40 illustrated in FIG. 3 may be substantially pure and may include little or no sulfates (e.g., less than 5% sulfates, less than 4% sulfates, less than 3% sulfates, less than 2% sulfates, less than 1% sulfates, or less than 0.1% sulfates). After the lead salt precipitate is formed, the remainder of the process 40, including the steps of isolating the lead salt precipitate (block 26), treating the lead salt precipitate to form the leady oxide (block 28), forming the leady oxide into an active material (block 30), and constructing lead-acid batteries (block 32), are substantially the same as described above with respect to the method 10 illustrated in FIG. 1. As mentioned above with respect to the process 10, the leady oxide active material formed by the process 40 enables the production of new lead-acid batteries having good to excellent electrical performance.

Figure 4:
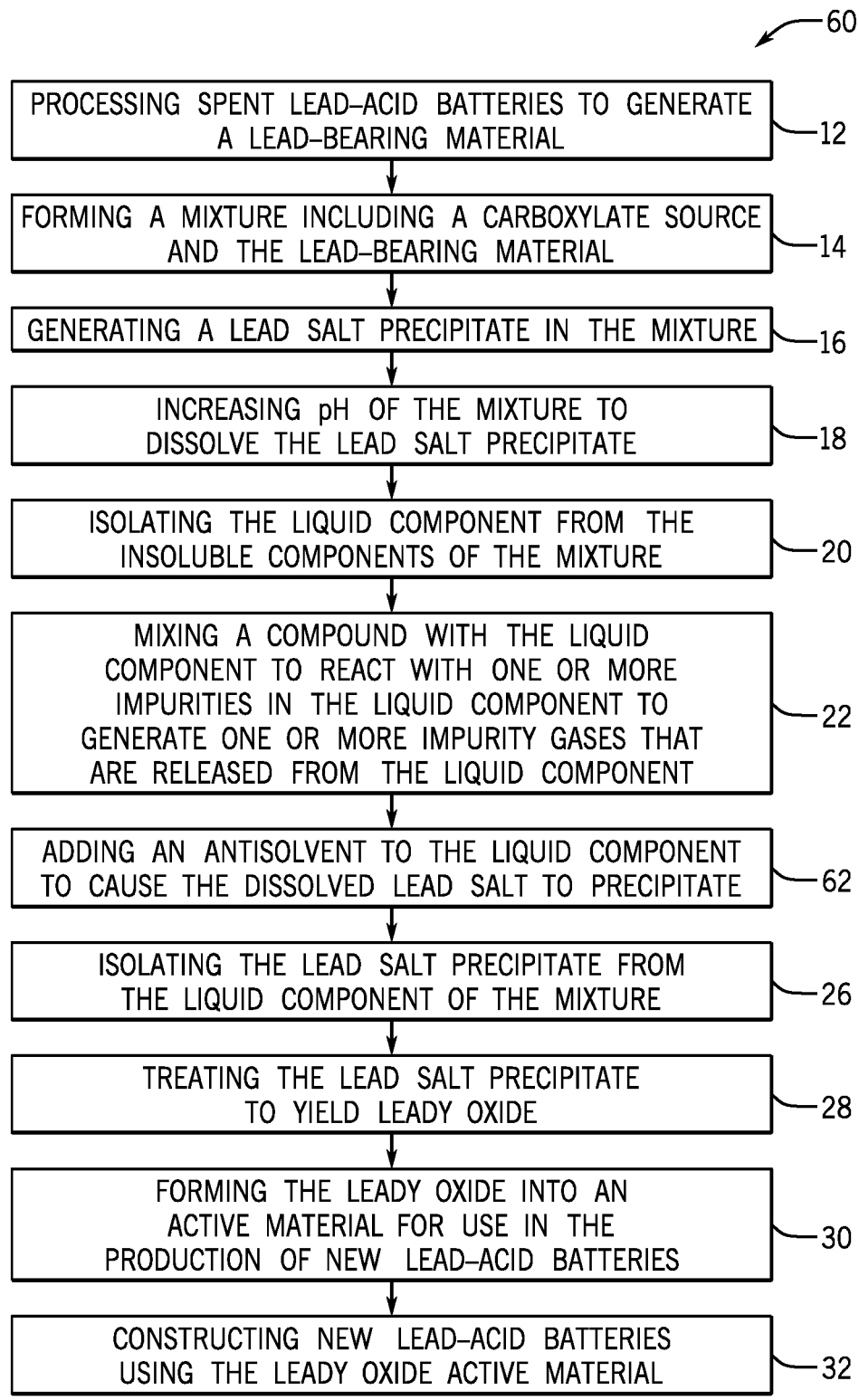
FIG. 4 is a flow diagram illustrating an embodiment of an alternative process by which lead from spent lead-acid batteries may be extracted, purified, and used in the construction of new lead-acid batteries.

FIG. 4 is a flow diagram illustrating an embodiment of a process 60 by which lead from spent lead-acid batteries may be extracted, purified, and used in the construction of a lead-acid battery. It may be appreciated that the process 60 illustrated in FIG. 4 is similar to the process 10 illustrated in FIG. 1; however, the process 60 illustrated in FIG. 4 includes the use of an antisolvent to promote the precipitation of the lead salt prior to isolation. Several of the steps of the illustrated process 60 are the same as the steps of the process 10, discussed above, and, as such, the present discussion will highlight the differences between the two processes. In particular, as illustrated in FIG. 4, after performing the actions described in blocks 12, 14, 16, 18, 20, and 22, the purified liquid component may include a dissolved lead salt (e.g., lead acetate, lead citrate). In the process 10, discussed above, a carboxylate source may be added (FIG. 1, block 24) to decrease the pH of the liquid component to cause the dissolved lead salt to precipitate. In contrast, for the process 60 illustrated in FIG. 4, an antisolvent may be added (block 62) to cause the dissolved lead salt to precipitate. For example, the antisolvent may be a solvent or a combination of solvents whose molecular structure includes a non-polar hydrocarbon portion as well as a polar portion containing a hetero atom such as oxygen, sulfur, or nitrogen. By specific example, a non-limiting list of antisolvents may include: methanol, ethanol, propanol, ethylene glycol, or combinations thereof.

After adding the antisolvent to the liquid component in block 62, the lead salt precipitate may be isolated from the liquid component in block 26, after which the lead salt precipitate may proceed to the actions described in blocks 28, 30, and 32. In contrast to the previously discussed processes, since an antisolvent replaces the pH adjustment to facilitate precipitate of the lead salt, the liquid component that is isolated from the lead salt precipitate in block 26 remains at a high pH value. Accordingly, in certain embodiments, the liquid component isolated in block 26 may proceed through a distillation step to recover the antisolvent from the remainder of the liquid component, and the recovered antisolvent may then be recycled back into process at block 62. Furthermore, after recovering the antisolvent via distillation, the high pH liquid component may be recycled back into the process 60. For example, in certain embodiments, this recovered, high-pH liquid component may be recycled into the leaching mixture formed in block 14 to facilitate leaching of the lead solids. By further example, in certain embodiments, this recovered high-pH liquid component may be recycled into block 18 to raise the pH of the mixture of block 18 and dissolve the lead salt precipitate formed in block 16. Accordingly, the aforementioned recycling may improve the efficiency of the process 60, when compared to the process 10, by avoiding the neutralization step of block 24 of the process 10, which limits the amount of base and acid (e.g., hydroxide and carboxylate source) consumed during the process 60.

One or more of the disclosed embodiments, alone or on combination, may provide one or more technical effects useful in the recycling of lead-acid batteries and/or in the recovery and purification of lead from waste materials. Embodiments of the present approach enable the industrial scale extraction and purification of lead from spent lead-acid batteries. Further, present embodiments enable the removal of several impurities (e.g., insoluble impurities, sulfates, alloying metals) from the recovered lead, thereby avoiding or reducing the formation of certain undesired combustion byproducts as well as the cost associated with scrubbing these byproducts from the exhaust stream. The technical effects and technical problems in the specification are exemplary and are not limiting. It should be noted that the embodiments described in the specification may have other technical effects and can solve other technical problems.

While only certain features and embodiments of the disclosure have been illustrated and described, many modifications and changes may occur to those skilled in the art (e.g., variations in sizes, dimensions, structures, shapes and proportions of the various elements, values of parameters (e.g., temperatures, pressures), mounting arrangements, use of materials, colors, orientations) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A method, comprising:
   (A) forming a mixture comprising a carboxylate source and a lead-bearing material;
   (B) generating a first lead salt precipitate in the mixture as the carboxylate source reacts with the lead-bearing material;
   (C) increasing the pH of the mixture to dissolve the first lead salt precipitate;
   (D) isolating a liquid component of the mixture from one or more insoluble components of the mixture;
   (E) adding an antisolvent to the liquid component to generate a second lead salt precipitate;
   (F) isolating the second lead salt precipitate from the liquid component of the mixture; and
   (G) recovering the antisolvent from the liquid component via distillation.

2. The method of claim 1, comprising: (H) recycling the antisolvent recovered in step (G) into step (E) to generate a second lead salt precipitate.

3. The method of claim 2, wherein step (H) further comprises:
   recycling at least a portion of the liquid component isolated from the antisolvent in step (G) into step (A) to facilitate leaching of lead solids.

4. The method of claim 1, wherein step (H) further comprises:
   recycling at least a portion of the liquid component isolated from the antisolvent in step (G) into step (C) to increase the pH of the mixture.

5. A method, comprising:
   (A) forming a mixture comprising a carboxylate source and a lead-bearing material;
   (B) generating a first lead salt precipitate in the mixture as the carboxylate source reacts with the lead-bearing material;
   (C) increasing the pH of the mixture to dissolve the first lead salt precipitate;
   (D) isolating a liquid component of the mixture from one or more insoluble components of the mixture;
   adding a hydride source to the liquid component isolated in step (D) to reduce an impurity of the liquid component and evolve a hydrogen-based impurity gas that is released from the liquid component;
   (E) adding an antisolvent to the liquid component to generate a second lead salt precipitate; and
   (F) isolating the second lead salt precipitate from the liquid component of the mixture.

6. The method of claim 5, wherein the impurity comprises a compound that includes tellurium, antimony, tin, selenium, arsenic, germanium, silicon, phosphorus, sulfur, or a combination thereof.

7. The method of claim 6, wherein the hydrogen-based impurity gas comprises hydrogen telluride, antimony trihydride (stibine), tin tetrahydride (stannane), hydrogen selenide, arsenic trihydride (arsine), germanium tetrahydride (germane), silicon hydrides (silane), phosphine, hydrogen disulfide, or a combination thereof.

8. The method of claim 5, wherein the hydride source comprises sodium tetraborohydride.

9. The method of claim 5, wherein the hydride source comprises sodium hydride.

10. The method of claim 5, wherein the at least one hydride source comprises hydrogen gas.

11. The method of claim 5, wherein the hydride source comprises syngas.

* * * * *